United States Patent

Taniuchi

[11] Patent Number: 4,488,428
[45] Date of Patent: Dec. 18, 1984

[54] ULTRASONIC AIR FLOWMETER FOR MOTOR VEHICLES

[75] Inventor: Kazuman Taniuchi, Saitama, Japan

[73] Assignee: Handa Giken Kogyo Kabushiki Kaisha, Tokyo, Japan

[21] Appl. No.: 396,173

[22] Filed: Jul. 7, 1982

[30] Foreign Application Priority Data

Jul. 7, 1981 [JP] Japan .................. 56-105861

[51] Int. Cl.³ .................................................. G01F 1/66
[52] U.S. Cl. ........................................ 73/118.2; 73/861.27
[58] Field of Search ............. 73/118 A, 861.02, 861.03, 73/861.18, 861.27, 861.31

[56] References Cited

U.S. PATENT DOCUMENTS

| 3,751,979 | 8/1973 | Ims | 73/861.27 |
| 4,078,428 | 3/1978 | Baker et al. | 73/861.31 |
| 4,333,352 | 6/1982 | Connery et al. | 73/861.18 |
| 4,408,589 | 10/1983 | Hauler et al. | 73/861.25 |

FOREIGN PATENT DOCUMENTS

| 2259355 | 8/1975 | France | 73/861.27 |
| 454424 | 3/1975 | U.S.S.R. | 73/861.31 |

OTHER PUBLICATIONS

J. L. McShane—"Ultrasonic Flowmeters"—Flow. Its Measurement & Control in Science & Industry, vol. 1, 1974, I.S.A.

Primary Examiner—Charles A. Ruehl
Attorney, Agent, or Firm—Sughrue, Mion, Zinn, Macpeak & Seas

[57] ABSTRACT

An ultrasonic air flowmeter for an internal combustion engine of a motor vehicle includes at least two ultrasonic transmitter-receivers. One of the ultrasonic transmitter-receivers generates ultrasonic waves toward an upstream of an air flow so that a radiation direction of the ultrasonic waves obliquely intersects a direction of the air flow. On the other hand, the other ultrasonic transmitter-receiver generates ultrasonic waves toward a downstream of the air flow in the same manner. A difference in phase between outputs of the receivers is detected to obtain a rate of the air flow.

2 Claims, 19 Drawing Figures

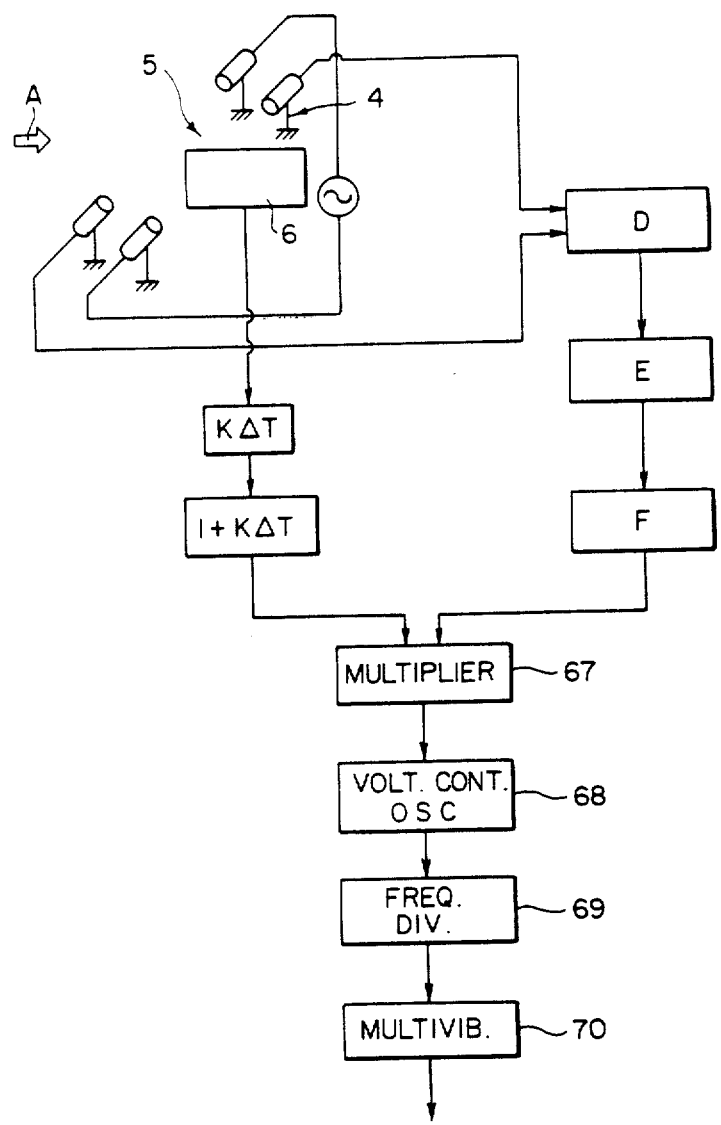

ULTRASONIC AIR FLOWMETER FOR MOTOR VEHICLES

BACKGROUND OF THE INVENTION

The present invention pertains to an ultrasonic air flowmeter for motor vehicles. More particularly, the invention relates to an ultrasonic air flowmeter including at least two transmitter-receivers which are provided to an intake passage of an internal combustion engine to measure the rate of an air flowing through the intake passage.

Heretofore, air flowmeters using a hot-wire a potentiometer or ultrasonic waves have been proposed as an air flowmeter to be equipped to motor vehicles. In the conventional air flowmeter using the ultrasonic waves, which generates Karman's vortex street in an air flow to measure an air flow rate, a sensor unit or a vortex street generator as well as the air flowmeters are provided in an air inlet passage. Therefore, pressure loss and the like may occur.

More specifically, the Karman's vortex street detection type ultrasonic air flowmeter which measures the flow velocity of an air by counting the number of Karman's vortexes generated for a certain unit time, has the following drawbacks. A laminar flow may often occur in a low speed range of the air flow, and therefore the vortexes are not easily formed. On the other hand, in a high speed range thereof, the vortex state becomes unstable.

SUMMARY OF THE INVENTION

In view of the above, a primary object of the invention is to eliminate the above described drawbacks accompanying the conventional ultrasonic air flowmeter.

Another object of the invention is to provide an ultrasonic air flowmeter capable of preventing an occurrence of loss in pressure so that measurement of an air flow rate is accomplished even in a low air flow speed range with high sensitivity and high accuracy.

A further object of the invention is to provide an ultrasonic air flowmeter small in size and light in weight, which is applicable to an internal combustion engine for a motorcycle.

The foregoing objects, as well as the other objects, are met by the provision of an ultrasonic air flowmeter according to the present invention, which includes a tube having a predetermined sectional shape and being disposed in an intake passage of an internal combustion engine, and at least two ultrasonic transmitter-receivers each composed of a transmission element and a reception element. The transmission element and the reception element are attached to the pipe in such a manner that a radiation direction of ultrasonic waves, which is to be received by the reception element facing the transmission element, is oblique relative to an air flow direction. Further, one ultrasonic transmitter-receiver operates to generate ultrasonic waves in a forward direction with respect to the air flow direction whereas the other operates to generate ultrasonic waves in a backward direction with respect thereto. The rate of the air flow is measured on the basis of a difference in phase of the ultrasonic waves received by the reception elements.

BRIEF DESCRIPTION OF THE DRAWINGS

In the accompanying drawings,

FIG. 7 is a block diagram schematically showing the embodiment; and

DETAILED DESCRIPTION OF THE PREFERRED EMBODIMENT

A preferred embodiment of the present invention will be described in detail with reference to the accompanying drawings.

Figure 1:
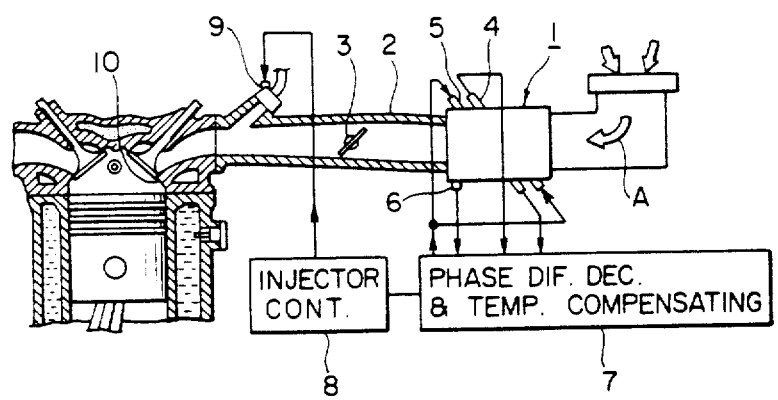
FIG. 1 is a schematic diagram illustrating an entire system of the present invention.

FIG. 1 is a schematic diagram illustrating an entire system of the present ultrasonic air flowmeter which is attached to an internal combustion engine for a motor vehicle. As shown in FIG. 1, a sensor unit 1 of the ultrasonic air flowmeter is arranged upstream relative to a throttle valve 3 of an intake passage 2. The sensor unit 1 is provided with two ultrasonic transmitter-receivers 4 and 5 which are juxtaposed to each other and are inclined with respect to the direction A of an air flow as shown in FIG. 1. The former 4 operates to generate ultrasonic waves in a forward direction with respect to the air flow direction A in the intake passage 2 whereas the latter 5 operates to generate ultrasonic waves in a backward direction. In the sensor unit 1, there is provided a thermistor 6 operable to measure the temperature of an inside air. The respective output signals of the ultrasonic transmitter-receivers 4 and 5 and the thermistor 6 are fed to a phase difference detecting and temperature compensating circuit 7 in which they are subjected to a predetermined signal processing operation. By these resultant output signals, an injector driving control circuit 8 is operated, and then an injector 9 is suitably driven to adjust an injection amount of a fuel to be injected into a cylinder 10.

A significant feature of the ultrasonic air flowmeter according to the present invention resides in that the two forward and backward ultrasonic transmitter-receivers 4 and 5 are juxtaposed in such a manner that a radiation direction of ultrasonic waves which are generated by transmission elements 4b and 5b, respectively, is oblique with respect to the air flow direction A, and in that a phase difference between output signals produced by reception elements 4a and 5a is detected and compensated to determine the flow velocity of an air flowing through the intake passage 2.

Figure 2:
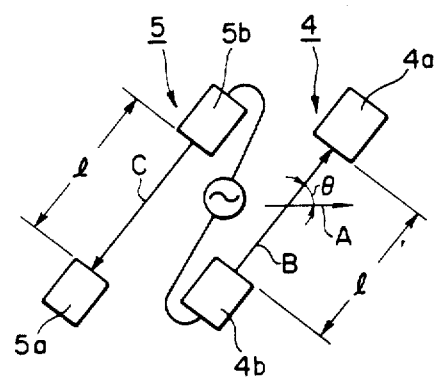
FIG. 2 is an explanatory diagram for explaining a phase difference method.

Next, the principle of a phase difference method, that is, that of a method for measuring the flow velocity of the air on the basis of the phase difference in the output signals of the reception elements 4a and 5a will be described with reference to FIG. 2. The two ultrasonic transmitter-receivers 4 and 5 each composed of a pair of transmission element and reception element are juxtaposed to each other in such manner that a radiation direction of ultrasonic waves is oblique with a certain angle θ with respect to the air flow direction A. As is clear from FIG. 2, the transmitter-receiver 4 generates ultrasonic waves in a forward direction with respect to the air flow direction A whereas the transmitter-receiver 5 generates ultrasonic waves in a backward direction with respect thereto. In FIG. 2, reference character l indicates a distance between the transmission element 4b or 5b and the reception element 4a or 5a. In this case, signals which are produced from the reception elements 4a and 5a, respectively, have time delays $t_1$ and $t_2$ expressed by equations $t_1 = l/(C + v \cdot \cos \theta)$ and $t_2 = l/(C - v \cdot \cos \theta)$ where v is the flow speed of the air and C is the speed of sound.

Hence, from the time delays $t_1$ and $t_2$, the time difference Δt proportional to the air flow speed v is obtained as follows:

$$\Delta v = t_2 - t_1 \approx 2 \cdot v \cdot l \cdot \cos \theta \text{ (assuming } C > v).$$

From the above equation, a relationship of $v \propto \Delta t C^2$ is obtained. Since the speed of sound C is varied with the temperature, the temperature compensation is conducted in the present invention by an approximation of a linear equation in view of the fact that the present flowmeter is used in a running vehicle.

Figure 3:
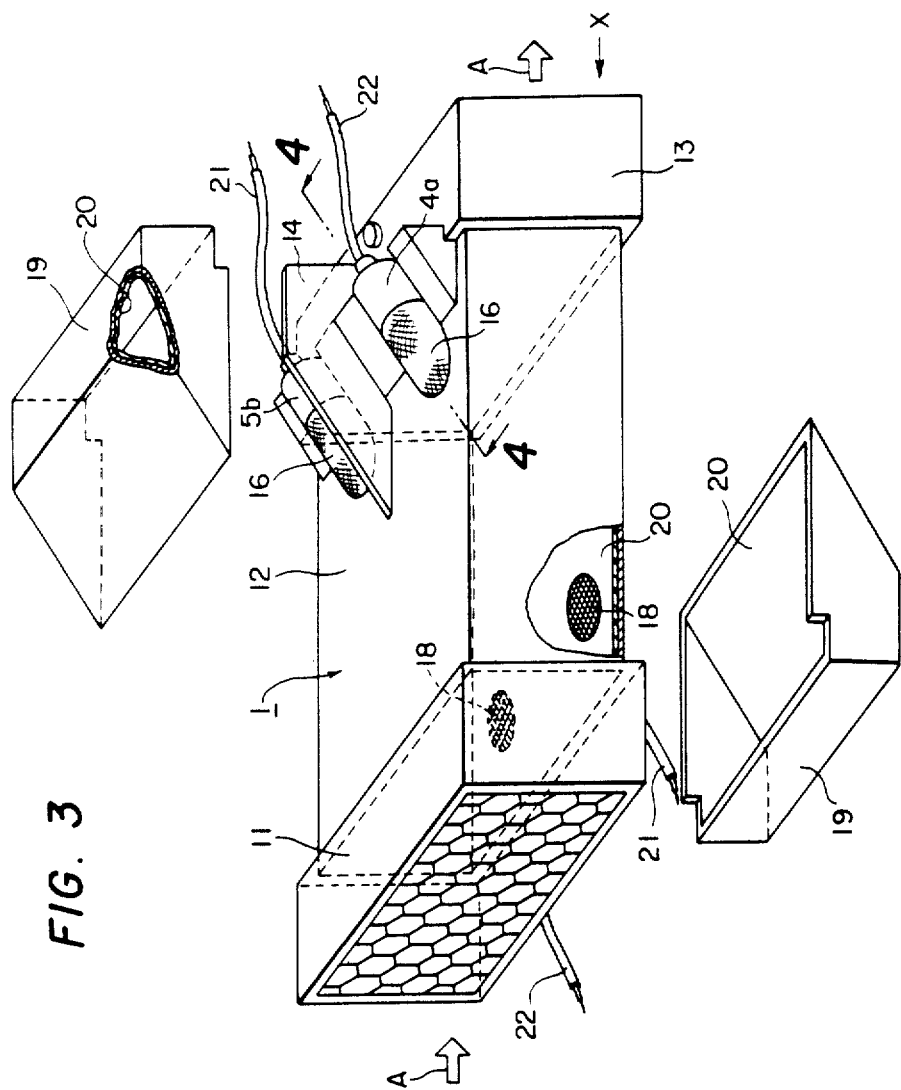
FIG. 3 is an enlarged perspective view illustrating an ultrasonic air flowmeter according to the invention.
Figure 4:
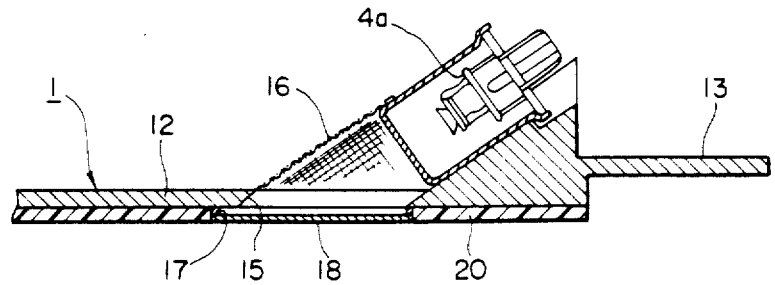
FIG. 4 is a cross-sectional view taken along a line IV—IV shown in FIG. 3.
Figure 5:
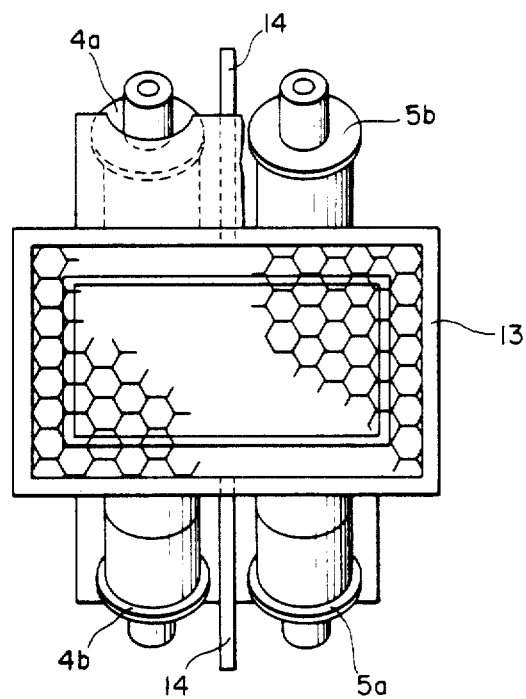
FIG. 5 is a side view of the flowmeter of the present invention, which is viewed from an observation point indicated by an arrow in FIG. 3.

Next, the construction of the ultrasonic air flowmeter according to the present invention will be described with reference to FIGS. 3 to 5 each showing the construction of the sensor unit 1 of the ultrasonic air flowmeter. The air applied to an inlet passes through an upstream honeycomb flow-arranging assembly 11, a passage 12 of a body of the sensor unit 1 of the flowmeter and a downstream honeycomb flow-arranging assembly 13 to a cylinder of an internal combustion engine. The transmission element 5b such as an ultrasonic oscillator and the reception element 4a which are juxtaposed to each other, are provided at an upper wall of the body passage 12 including a tubular member having a predetermined sectional shape. In a lower wall of the passage 12, on the other hand there are provided the transmission element 4b and the reception element 5a, which are juxtaposed to each other. The transmission element 4b and the reception element 4a make a pair to constitute the ultrasonic transmitter-receiver 4 whereas the transmission element 5b and the reception element 5a make a pair to constitute the ultrasonic transmitter-receiver 5. The ultrasonic transmitter-receiver 4 generates the ultrasonic waves in the forward direction whereas the ultrasonic transmitter-receiver 5 generates the ultrasonic waves in the backward direction.

Each of those ultrasonic transmitter-receivers is attached to the body of the sensor unit 1 in such a manner that the axis joining the transmission and reception elements, that is, a radiation direction of ultrasonic waves is inclined with respect to the body passage 12. Moreover, a partition (i.e., an ultrasonic shielding plate) 14 is provided to interpose between the transmission element 5b and the reception element 4a so as to prevent the transmission element 5b and the reception element 4a from interfering with each other. A similar partition is also provided to interpose between the transmission element 4b and the reception element 5a on the lower wall of the body passage 12.

The transmission elements 4b and 5b and the reception elements 4a and 5a are attached to the upper and lower walls, but no inner ends of the elements are protruded into the body passage 12 so as not to disturb the air flow. This results in preventing pressure loss from occuring. As is apparent from FIG. 4, screen domes (i.e., ultrasonic shielding members) 16 are provided between the reception element 4a and an aperture 15 formed in the upper wall of the sensor unit 1, and between the transmission element 5b and an aperture 15 in the upper wall, respectively. Further, screens 18 are mounted in the aperture 15 by means of an elliptical rings 17. Therefore, the ultrasonic waves can be transmitted from the transmission elements 4b and 5b and received by the reception elements 4a and 5a without any interference caused by an ambient air. While FIG. 4 only shows the reception element 4a attached to the upper wall of the sensor unit 1, the other elements 4b, 5a and 5b are attached to the upper or lower wall in the same manner. Further, the elements attached to the upper wall are covered by a common cover 19 whereas the elements attached to the lower wall in the same manner are also covered by a common cover 19. In order to prevent undesired leakage of ultrasonic waves, an inner space of the cover 19 is filled with a sound-absorbing material such as glass wool 20 and an inner surface of the body passage 12 is also covered with a sound-absorbing material such as unwoven fabric.

The downstream honeycomb flow-arranging plate 13 is provided on its upper wall with the thermistor 6 serving as a temperature sensor. Coupling wires 21 are connected to the transmission elements 4b and 5b, and coupling wires 22 are connected to the reception elements 4a and 5a, so that these elements are coupled to a processing circuit described later therethrough.

Figure 6:
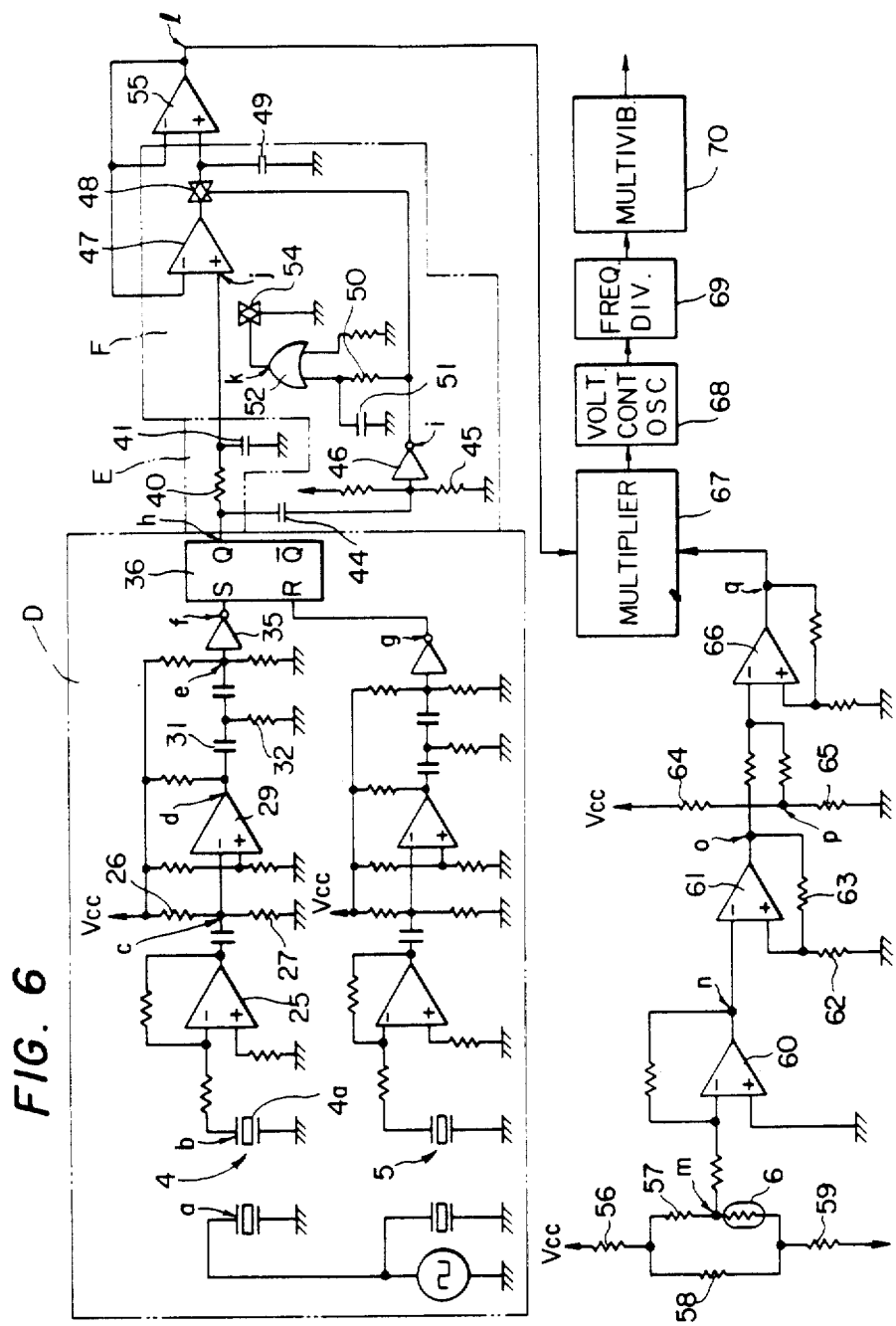
FIG. 6 is a detailed circuit diagram showing one preferred embodiment of the present system.

FIG. 6 is a circuit diagram showing the processing ciruit for processing the output signals of the reception element 4a and 5a to obtain the flow speed and rate of air on the basis of the phase difference. FIG. 7 is a block diagram schematically showing the circuit of FIG. 6. FIGS. 8a to 8l are waveform diagrams each showing a waveform of a signal appearing at a point in FIG. 6.

The signal processing circuit is composed of a phase difference detecting circuit unit, a temperature compensating circuit unit and a signal generating circuit unit.

The phase difference detecting circuit unit is composed of a circuit D for converting a signal representative of the phase difference in the output signals of the respective forward and backward ultrasonic transmitter-receivers 4 and 5 into a time signal, a circuit E for converting the thus converted time signal into a voltage signal and a circuit F for sample-and-holding the peak value of the voltage signal.

Figure 8A:
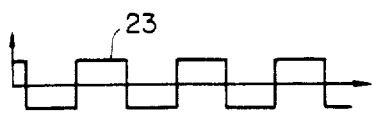
FIG. 8a through FIG. 8l are diagrams showing waveforms of signals appearing at the respective points a to l shown in FIG. 7.
Figure 8B:
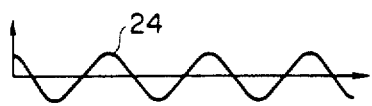
Figure 8C:
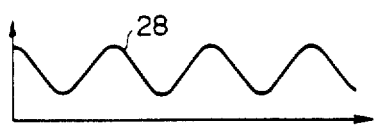
Figure 8D:
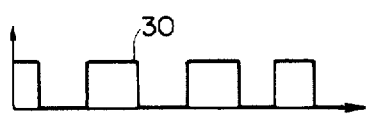
Figure 8E:
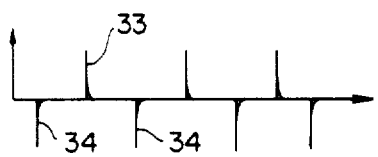
Figure 8F:

In the circuit D, the processing operation of the output signal of the forward ultrasonic transmitter-receiver 4 will be described. The ultrasonic wave signal 23 having a square waveform is generated at a point a, and then received by the reception element 4a. The output signal 24 appearing at a point b has a sine waveform. The signal 24 is amplified by an amplifier 25, and a DC voltage is then added thereto by resistors 26 and 27 so that a biased signal 28 having a waveform as shown in FIG. 8c is obtained at a point c. The signal 28 is fed to a comparator 29 to be compared with the DC bias voltage as a threshold level. As a result, a signal 30 having a square waveform is obtained at a point d. The signal 30 is differentiated by a capacitor 31 and a resistor 32 to thereby obtain a pulse signal having rising pulses 33 and breaking pulses 34, as shown in FIG. 8e, at a point e. The breaking pulses 34 thus obtained are inverted in an inverter 35 to be applied to a flip-flop 36 as a set input signal 37. The waveform of the set input signal 37 is shown in FIG. 8f.

Figure 8G:
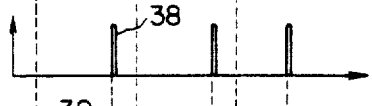

The output signal of the backward ultrasonic transmitter-receiver 5 is also processed similarly to the above-mentioned signal to obtain a reset signal 38, as shown in FIG. 8g, at a point g. By this processing operation, a reset signal 38 of the flip-flop 36 is generated at a point g. The reset signal 38 is fed to a reset terminal R of the flip-flop 36.

Figure 8H:
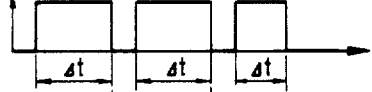
Figure 8I:
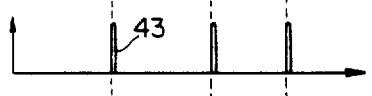

In response to the aforementioned set signal 37 and reset signal 38, the flip-flop 36 produces a square wave signal 39 as shown in FIG. 8h. A pulse width of the signal 39 represents the phase time difference Δt.

Figure 8J:
Figure 8K:
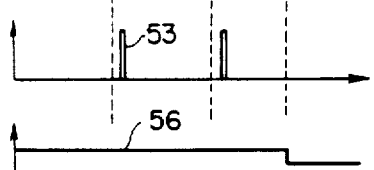

The signal 39 produced by the flip-flop 36 are integrated by the circuit E including a resistor 40 and a capacitor 41 so as to obtain at a point j a signal 42 having a saw-tooth waveform as shown in FIG. 8j.

At the subsequent step, the peak value of the signal 42 is sample-held in the circuit F. In this case, a signal 43 appearing at a point i, which is prepared by differentiating the output signal of the flip-flop 36 by a capacitor 44 and a resistor 45 and then inverting the differentiated signal by an inverter 46, is used as a timing signal for this sample-holding operation. More specifically, the sample-holding operation of the peak value is accomplished by feeding the signal 42 to a buffer amplifier 47, turning on and off an analog switch 48 in response to the timing signal 43 and then charging a capacitor 49.

If the peak value of the signal 42 is held in the capacitor 49, the signal 42 becomes unnecessary. Accordingly, the capacitor 41 is discharged by turning on an analog switch 54 with a suitable timing in response to a timing signal 54 which is obtained by delaying the signal 43 by the use of a resistor 50, a capacitor 51 and an OR circuit 52.

Figure 8L:
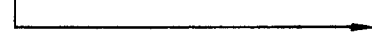

The output signal 56 of this sample-and-hold circuit F exhibits a waveform shown in FIG. 8l after amplified by a buffer amplifier 55. In other words, a voltage signal corresponding to the phase time difference Δt is produced.

In the temperature compensating circuit, a circuit including the thermistor 6 serving as a temperature sensor and resistors 56, 57, 58 and 59 operates to produce a variation ΔV in potential at a point m, which is linearly varied about a reference temperature value of 25° C. in accordance with a variation ΔT in temperature. In this case, a relationship of $\Delta V \propto \alpha_1 \Delta T$ where $\alpha_1$ is a proportional constant, is established. The output signal of the differential amplifier 60 (appearing at a point n) is so set as to be 0 [V] when T=25° C. (ΔT=0° C.). Assuming that an amplification factor of the differential amplifier 60 is $\alpha_2$, the output of the amplifier 60 is expressed as $\alpha_2 \Delta V = \alpha_1 \alpha_2 \Delta T$. Thereafter, the output of the amplifier 60 is applied to an amplifier 61 to be amplified therein. If an amplification factor of the amplifier 61 is $\beta$, its output is expressed as $\alpha_2 \beta \Delta T$.

The amplification factor $\beta$ is preset by resistors 62 and 63 so that $\alpha_2 \beta \Delta V = K \Delta T$. In this case, the K indicates the constant K included in the expression of a temperature compensating constant $\gamma = 1 + K \Delta T$, and therefore the voltage appearing at a point o is equal to KΔT. On the other hand, resistors 64 and 65 are selected so that the voltage appearing at a point p is equal to 1 [V]. This voltage is added through an amplifier 66 to the KΔT and then the voltage signal representative of the temperature compensating constant $\gamma = 1 + K \Delta T$ is obtained as an output of the amplifier 66.

The output of the phase difference detecting circuit unit appearing at the point l and the output of the temperature compensating circuit unit are applied to a multiplier 67 to obtain a voltage output signal representing the air flow speed. Subsequently, the output signal of the multiplier 67 is subjected to voltage-frequency conversion in a voltage control oscillator 68, and then converted to a signal having a predetermined frequency in a frequency divider 69. A monostable multivibrator 70 is controlled according to the output of the frequency divider 69 to thereby produce an output signal for controlling an operation of the injector 9. The oscillator 68 constitutes the signal generating circuit unit together with the frequency divider 69 and the monostable multivibrator 70.

As is apparent from the above description, according to the present invention, there is nothing to obstruct the air flow in the passage of the sensor unit. Consequently, the present invention is advantageous in that no pressure loss occurs resulting in improving an engine performance, and in that a large degree of freedom for the design of the sensor unit is obtainable. Further, since the generation of Karman's vortexes is not required for the flow speed measurement, the sensitivity to the measurement within the low speed range is enhanced.

Furthermore, the ultrasonic transmitter-receivers are attached to the outside of the passage of the sensor unit with screen domes and an inner surface of the sensor unit and the like are covered by sound-absorbing materials, and therefore it is possible to reduce the disturbances in the signal output, which may be caused by the reflections of the ultrasonic waves, the disturbing noise and the like.

Moreover, since the two ultrasonic transmitter-receivers are employed to determined the phase time difference Δt and the temperature compensation operation is simultaneously accomplished in accordance with a linear approximation, according to the present invention, as ultrasonic air flowmeter which is high in response speed and in measurement accuracy, is obtainable.

What is claimed is:

1. An ultrasonic air flowmeter for internal combustion engine of a motor vehicle comprising: a seonsor unit provided to an intake passage having one end vented to an atmosphere and the other end communicating with a combustion chamber of said engine; and a processing circuit for processing output signals of said sensor unit to measure an air flow rate wherein said sensor unit comprises a tubular member having a predetermined sectional shape through which an air to be supplied to the combustion chamber flows, and at least two ultrasonic transmitter-receivers, one of said ultrasonic transmitter-receivers including a first transmission element and a first reception element facing each other being provided to said tubular member in such a manner that a radiation direction of ultrasonic waves generated by said first transmission element to said first reception element obliquely intersections the air flow in said tubular member toward a downstream of the air flow and the other transmitter-receiver including a second transmission element and a second reception element facing each other being provided to said tubular member in such a manner that a radiation direction of ultrasonic waves generated by said second transmission element to said second reception element obliquely intersects the air flow in said tubular member toward an upstream of the air flow, wherein said processing circuit operates to detect a difference in phase between a first output signal of said first reception element and a second output signal of said second reception element so that the air flow rate in said tubular member is measured on the basis of the thus detected phase difference; wherein said first and second transmission elements and said first and second reception elements are provided at apertures on an outer surface of said tubular member and communicate with the interior of said tubular member through screen dome shields which are mounted in the apertures by means of elliptical rings, wherein said first transmission element and said second reception element are juxtaposed each other under a first common cover having an interior surface lined with sound-absorbing material; and wherein said second transmission element and said first reception element are juxtaposed each other under a second common cover having an interior surface lined with sound-absorbing material.

2. The ultrasonic air flowmeter as defined in claim 1 wherein an ultrasonic shielding plate is interposed between said juxtaposed transmission and reception elements to prevent interference between the transmission and reception elements.

* * * * *

UNITED STATES PATENT AND TRADEMARK OFFICE
CERTIFICATE OF CORRECTION

PATENT NO. : 4,488,428

DATED : December 18, 1984

INVENTOR(S) : Kazuman Taniuchi

It is certified that error appears in the above-identified patent and that said Letters Patent is hereby corrected as shown below:

On the cover page, in the heading of the patent,
  item [73] to read as follows:

--Assignee: Honda Giken Kogyo Kabushiki Kaisha, Tokyo, Japan--.

Signed and Sealed this

Seventh Day of May 1985

[SEAL]

Attest:

DONALD J. QUIGG

*Attesting Officer*     *Acting Commissioner of Patents and Trademarks*